(12) United States Patent
Wang et al.

(10) Patent No.: US 11,589,101 B2
(45) Date of Patent: Feb. 21, 2023

(54) DATA TRANSMISSION METHOD AND APPARATUS

(71) Applicant: HANGZHOU HIKVISION DIGITAL TECHNOLOGY CO., LTD., Hangzhou (CN)

(72) Inventors: Xinghe Wang, Hangzhou (CN); Anmin Xin, Hangzhou (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/281,222

(22) PCT Filed: Sep. 25, 2019

(86) PCT No.: PCT/CN2019/107731
§ 371 (c)(1),
(2) Date: Mar. 29, 2021

(87) PCT Pub. No.: WO2020/063635
PCT Pub. Date: Apr. 2, 2020

(65) Prior Publication Data
US 2021/0392391 A1    Dec. 16, 2021

(30) Foreign Application Priority Data

Sep. 28, 2018   (CN) .......................... 201811142210.9

(51) Int. Cl.
*H04N 21/266* (2011.01)
*H04N 21/262* (2011.01)
(Continued)

(52) U.S. Cl.
CPC ... *H04N 21/2662* (2013.01); *H04N 21/26216* (2013.01); *H04N 21/6437* (2013.01)

(58) Field of Classification Search
CPC ......... H04N 21/2662; H04N 21/26216; H04N 21/6437
(Continued)

(56) References Cited

U.S. PATENT DOCUMENTS

2005/0169174 A1    8/2005  Apostolopoulos et al.
2005/0254447 A1*  11/2005  Miller-Smith ... H04N 21/44004
                                                          370/315
(Continued)

FOREIGN PATENT DOCUMENTS

CN          1901504 A      1/2007
CN        101707697 A      5/2010
(Continued)

OTHER PUBLICATIONS

Extended European search report of counterpart EP application No. 19865006.1 dated Oct. 21, 2021.
(Continued)

*Primary Examiner* — Dominic D Saltarelli
(74) *Attorney, Agent, or Firm* — Knobbe, Martens, Olson & Bear, LLP

(57) ABSTRACT

The present disclosure relates to a data transmission method and apparatus, and belongs to the field of Internet technology. The method includes: determining whether a to-be-sent video data packet exists each time a preset data sending cycle is reached; if the to-be-sent video data packet does not exist, selecting at least one video data packet, a number of times the at least one video data packet has been sent satisfying a preset sending-times condition and total data volume of the at least one video data packet satisfying a preset expected data-volume condition, from sent video data packets based on a number of times each of the sent video data packets has been sent, and determining a filling data
(Continued)

packet according to selected video data packet; and sending the filling data packet to a receiving terminal.

16 Claims, 4 Drawing Sheets

(51) Int. Cl.
    *H04N 21/643*     (2011.01)
    *H04N 21/2662*     (2011.01)
    *H04N 21/6437*     (2011.01)

(58) Field of Classification Search
    USPC ..................................................... 375/240.1
    See application file for complete search history.

(56) References Cited

U.S. PATENT DOCUMENTS

| | | | |
|---|---|---|---|
| 2007/0153916 | A1 | 7/2007 | Demircin et al. |
| 2008/0273600 | A1 | 11/2008 | Singh et al. |
| 2010/0058133 | A1 | 3/2010 | Lee |
| 2013/0054537 | A1 | 2/2013 | Das et al. |
| 2014/0112120 | A1 | 4/2014 | Kim et al. |
| 2015/0349930 | A1* | 12/2015 | Sazawa ................. H04L 43/16 370/254 |

FOREIGN PATENT DOCUMENTS

| | | |
|---|---|---|
| CN | 101729373 A | 6/2010 |
| CN | 102045552 A | 5/2011 |
| CN | 102316315 A | 1/2012 |
| CN | 104320416 A | 1/2015 |
| CN | 104410587 A | 3/2015 |
| EP | 2605454 A1 | 6/2013 |

OTHER PUBLICATIONS

International search report in PCT application No. PCT/CN2019/10//31 dated Dec. 24, 2019.
First office action in Chinese application No. 201811142210.9 dated Aug. 5, 2020.

\* cited by examiner

DATA TRANSMISSION METHOD AND APPARATUS

The present application is a US National Phase Application of International Application No. PCT/CN2019/107731, filed on Sep. 25, 2019, which claims priority to Chinese Patent Application No. 201811142210.9, filed on Sep. 28, 2018 and entitled "DATA TRANSMISSION METHOD AND APPARATUS", the entire contents of each of which are incorporated herein by reference in their entireties.

TECHNICAL FIELD

The present disclosure relates to the field of Internet technology, and more particularly to a data transmission method and apparatus.

BACKGROUND

With the development of science and technology, the real-time transmission technology has stepped into people's lives. A sending terminal may continuously capture an environmental video by a video capturing device, process the environmental video by encoding, compressing, packaging or the like to obtain a real-time transport protocol (RTP) data packet, and then send the RTP data packet immediately to a receiving terminal through a transmission network based on the RTP. Since each RTP data packet carries a corresponding serial number, the receiving terminal may determine whether packet loss occurs based on whether the serial number is discontinued. If the packet loss occurs, the sending terminal may send the serial number corresponding to the RTP data packet with the packet loss to the sending terminal, and the sending terminal retransmits the RTP data packet with the packet loss based on the serial number. However, this back-and-forth process takes a rather long time. The method for solving this problem may be that the sending terminal generates redundant data for recovering the RTP data packet, and sends the redundant data together with the RTP data packet to the receiving terminal. Thus, when the packet loss occurs, the receiving terminal may recover the RTP data packet with the packet loss based on the redundant data, which eliminates the time consumed by the back-and-forth process. However, an additional bandwidth is required for transmitting the redundant data.

SUMMARY

In order to overcome the problems in the related prior art, the present disclosure provides the following technical solutions.

According to a first aspect of embodiments of the present disclosure, a data transmission method is provided. The method includes:

determining whether a to-be-sent video data packet exists each time a preset data sending cycle is reached;

if the to-be-sent video data packet does not exist, selecting at least one video data packet, a number of times the at least one video data packet has been sent satisfying a preset sending-times condition and total data volume of the at least one video data packet satisfying a preset expected data-volume condition, from sent video data packets based on a number of times each of the sent video data packets has been sent, and determining a filling data packet according to selected video data packet; and sending the filling data packet to a receiving terminal.

Optionally, selecting at least one video data packet, the number of times the at least one video data packet has been sent satisfying the preset sending-times condition and total data volume of the at least one video data packet satisfying the preset expected data-volume condition, from the sent video data packets based on the number of times each of the sent video data packets has been sent, and determining the filling data packet according to the selected video data packet include:

selecting at least one video data packet, the number of times the at least one video data packet has been sent satisfying the preset sending-times condition and total data volume of the at least one video data packet satisfying the preset expected data-volume condition, from the sent video data packets corresponding to a current video frame and a previous video frame based on the number of times each of the sent video data packets has been sent, and determining the filling data packet according to the selected video data packet.

Optionally, selecting at least one video data packet, the number of times the at least one video data packet has been sent satisfying the preset sending-times condition and total data volume of the at least one video data packet satisfying the preset expected data-volume condition, from the sent video data packets corresponding to the current video frame and the previous video frame based on the number of times each of the sent video data packets has been sent, and determining the filling data packet according to the selected video data packet include:

determining whether the video data packet which has been sent less than the first preset times threshold exists in the sent video data packets corresponding to the current video frame;

selecting a video data packet which has been sent less than a first preset times threshold if the video data packet which has been sent less than the first preset times threshold exists in the sent video data packets corresponding to the current video frame; selecting a video data packet which has been sent less than a second preset times threshold from the sent video data packets corresponding to the previous video frame if the video data packet which has been sent less than the first preset times threshold does not exist in the sent video data packets corresponding to the current video frame;

determining whether the total data volume of the selected video data packet satisfies the preset expected data-volume condition or not; and determining the filling data packet according to the selected video data packet if the total data volume of all the selected video data packet satisfies the preset expected data-volume condition; and returning to execute a step of determining whether the video data packet which has been sent less than the first preset times threshold exists in the sent video data packets corresponding to the current video frame if the total data volume of all the selected video data packet does not satisfy the preset expected data-volume condition.

Optionally, selecting at least one video data packet, the number of times the at least one video data packet has been sent satisfying the preset sending-times condition and total data volume of the at least one video data packet satisfying the preset expected data-volume condition; from the sent video data packets corresponding to the current video frame and the previous video frame based on the number of times each of the sent video data packets has been sent, and determining the filling data packet according to the selected video data packet include:

determining whether the video data packet which has been sent less than the first preset times threshold exists in the sent video data packets corresponding to the current video frame;

selecting a video data packet which has been sent less than the first preset times threshold if the video data packet which has been sent less than the first preset times threshold exists in the sent video data packets corresponding to the current video frame; selecting a video data packet which has been sent less than the second preset times threshold from the sent video data packets corresponding to the previous video frame if the video data packet which has been sent less than the first preset times threshold does not exist in the sent video data packets corresponding to the current video frame and the video data packet which has been sent less than the second preset times threshold exists in the sent video data packet corresponding to the previous video frame; and increasing the first preset times threshold by a first preset increase value, increasing the second preset times threshold by a second preset increase value, and returning to execute the step of determining whether the video data packet which has been sent less than the first preset times threshold exists in the sent video data packets corresponding to the current video frame if the video data packet which has been sent less than the first preset times threshold does not exist in the sent video data packets corresponding to the current video frame, and the video data packet which has been sent less than the second preset times threshold does not exist in the sent video data packet corresponding to the previous video frame;

determining whether the total data volume of the selected video data packet satisfies the preset expected data-volume condition or not; and determining the filling data packet according to the selected video data packet if the total data volume of all the selected video data packet satisfies the preset expected data-volume condition; and returning to execute a step of determining whether the video data packet which has been sent less than the first preset times threshold exists in the sent video data packets corresponding to the current video frame if the total data volume of all the selected video data packet does not satisfy the preset expected data-volume condition.

Optionally, determining the filling data packet according to the selected video data packet if the total data volume of all the selected video data packet satisfies the preset expected data-volume condition includes:

determining the total data volume of all the selected video data packet and a sum of data volume of the selected video data packet except the video data packet currently selected;

if the total data volume is greater than a preset expected data volume, determining an absolute value of a difference value between the total data volume and the expected data volume, determining an absolute value of a difference value between the sum and the expected data volume, and determining the video data packet corresponding to the minimum absolute value as the filling data packet;

if the total data volume is equal to the preset expected data volume, determining the selected video data packet as the filling data packet;

returning to execute a step of determining whether the video data packet which has been sent less than the first preset times threshold exists in the sent video data packets corresponding to the current video frame if the total data volume of all the selected video data packet does not satisfy the preset expected data-volume condition includes:

if the total data volume is less than the preset expected data volume, returning to execute a step of determining whether the video data packet which has been sent less than the first preset times threshold exists in the sent video data packets corresponding to the current video frame.

Optionally, selecting the video data packet which has been sent less than the first preset times threshold includes:

selecting a video data packet which has been sent a number of times that is less than the first preset times threshold and has a minimum value;

selecting the video data packet which has been sent less than the second preset times threshold from the sent video data packets corresponding to the previous video frame includes:

selecting a video data packet, which has been sent a number of times that is less than the second preset, times threshold and has a minimum value, from the sent, video data packets corresponding to the previous video frame.

According to a second aspect of embodiments of the present disclosure, a data transmission apparatus is provided. The apparatus includes:

a determining module used to determine whether a to-be-sent video data packet exist or not each time a preset data sending cycle is reached;

a filling module used to select, if the to-be-sent video data packet does not exist, at least one video data packet, a number of times the at least one video data packet has been sent satisfying a preset sending-times condition and total data volume of the at least one video data packet satisfying a preset expected data-volume condition, from sent video data packets based on a number of times each of the sent video data packets has been sent, and determine a filling data packet according to the selected video data packet; and a sending module used to send the filling data packet to a receiving terminal.

Optionally, the filling module is used to:

select at least one video data packet, the number of times the at least one video data packet has been sent satisfying the preset sending-times condition and total data volume of the at least one video data packet satisfying the preset expected data-volume condition, from the sent video data packets corresponding to a current video frame and a previous video frame based on the number of times each of the sent video data packets has been sent, and determine the filling data packet according to the selected video data packet.

Optionally, the filling module is used to:

determine whether the video data packet which has been sent less than the first preset times threshold exists in the sent video data packets corresponding to the current video frame;

select a video data packet which has been sent less than a first preset times threshold if the video data packet which has been sent less than the first preset times threshold exists in the sent video data packets corresponding to the current video frame; select a video data packet which has been sent less than a second preset times threshold from the sent video data packets corresponding to the previous video frame if the video data packet which has been sent less than the first preset times threshold does not exist in the sent video data packets corresponding to the current video frame;

determine whether the total data volume of the selected video data packet satisfies the preset expected data-volume condition or not; and determine the filling data packet according to the selected video data packet if the total data volume of all the selected video data packet satisfies the preset expected data-volume condition; and return to execute a step of determining whether the video data packet which has been sent less than the first preset times threshold exists in the sent video data packets corresponding to the current video frame if the total data volume of all the selected video data packet does not satisfy the preset expected data-volume condition.

Optionally, the filling module is used to:

determine whether the video data packet which has been sent less than the first preset times threshold exists in the sent video data packets corresponding to the current video frame;

select a video data packet which has been sent less than the first preset times threshold if the video data packet which has been sent less than the first preset times threshold exists in the sent video data packets corresponding to the current video frame; select a video data packet which has been sent less than the second preset times threshold from the sent video data packets corresponding to the previous video frame if the video data packet which has been sent less than the first preset times threshold does not exist in the sent video data packets corresponding to the current video frame and the video data packet which has been sent less than the second preset times threshold exists in the sent video data packet corresponding to the previous video frame; and increase the first preset times threshold by a first preset increase value, increase the second preset times threshold by a second preset increase value, and return to execute the step of determining whether the video data packet which has been sent less than the first preset times threshold exists in the sent video data packets corresponding to the current video frame, if the video data packet which has been sent less than the first preset times threshold does not exist in the sent video data packets corresponding to the current video frame and the video data packet which has been sent less than the second preset times threshold does not exist in the sent video data packet corresponding to the previous video frame;

determine whether the total data volume of the selected video data packet satisfies the preset expected data-volume condition or not; and determine the filling data packet according to the selected video data packet if the total data volume of all the selected video data packet satisfies the preset expected data-volume condition; and returning to execute a step of determining whether the video data packet which has been sent less than the first preset times threshold exists in the sent video data packets corresponding to the current video frame if the total data volume of all the selected video data packet does not satisfy the preset expected data-volume condition.

Optionally, the filling module is used to:

determine the total data volume of all the selected video data packet and a sum of data volume of the selected video data packet except the video data packet currently selected;

if the total data volume is greater than a preset expected data volume, determine an absolute value of a difference value between the total data volume and the expected data volume, determine an absolute value of a difference value between the sum and the expected data volume, and determine the video data packet corresponding to the minimum absolute value as the filling data packet;

if the total data volume is equal to the preset expected data volume, determine the selected video data packet as the filling data packet; and if the total data volume is less than the preset expected data volume, return to execute a step of determining whether the video data packet which has been sent less than the first preset times threshold exists in the sent video data packets corresponding to the current video frame.

Optionally, the filling module is used to:

select a video data packet which has been sent a number of times that is less than the first preset times threshold and has a minimum value; and select a video data packet, which has been sent a number of times that is less than the second preset times threshold value and has a minimum value, from the sent video data packets corresponding to the previous video frame.

According to a third aspect of embodiments of the present disclosure, a computer device is provided. The computer device includes: a processor, a communication interface, a memory, and a communication bus, wherein:

the processor, the communication interface, and the memory complete communication with each other through the communication bus;

the memory is used to store a computer program; and the processor is used to execute the program stored in the memory to implement the data transmission method as described above.

According to a fourth aspect of embodiments of the present disclosure, a computer-readable storage medium storing computer programs is provided. When the computer programs are executed by a processor, the data transmission method as described above is implemented.

The technical solutions provided by the present disclosure may include the following benefits.

With the method provided in the embodiment of the present disclosure, when the to-be-sent video data pack does not exist, the sent video data packet may be sent to the receiving terminal as a filling data packet. In this way, it can be ensured that the sending terminal may send data to the receiving terminal in each data sending cycle, and the data volume as sent is approximate to the expected data volume, so that the actual sending bit rate of the sending terminal is approximately equal to the expected sending bit rate, and the sending terminal may thereby determine an accurate expected sending bit rate when the next bit rate calculating cycle is reached, which is beneficial for the sending terminal to send data according to the accurate expected sending bit rate, and thereby improves the network transmission efficiency. Furthermore, with the method provided in the embodiment of the present disclosure, based on the number of times each of the sent video data packets has been sent, a video data packet, the number of times the at least one video data packet has been sent satisfying the preset sending-times condition and total data volume of the at least one video data packet satisfying the preset expected data-volume condition, may be selected as the filling data packet and then sent to the receiving terminal. In this way, even if the previously sent video data packet is lost, the filling data packet may be adopted to replace the video data packet where the loss occurs, so that the filling data packet is effectively utilized to improve the quality of data transmission.

It is to be understood that both the foregoing general description and the following detailed description are exemplary and explanatory only and are not intended to limit the present disclosure.

Figure 1:
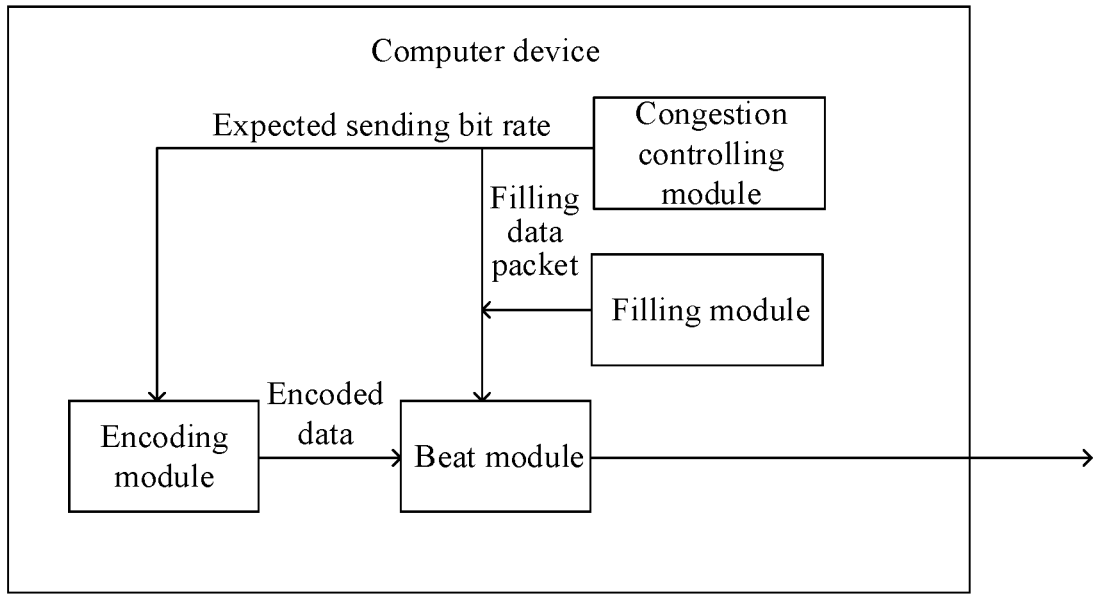
FIG. 1 is a schematic diagram of a structure of a computer device according to an embodiment of the present disclosure.

Through the aforesaid drawings, certain embodiments of the present disclosure have been shown and will be described in more detail below. The drawings and written description are not intended to limit the scope of the concepts of the present disclosure in any way, but rather to illustrate the concepts of the present disclosure to those skilled in the art by referring to specific embodiments

DETAILED DESCRIPTION

Reference will now be made in detail to exemplary embodiments, examples of which are illustrated in the accompanying drawings. Where the following description hereinafter refers to the accompanying drawings, the same reference numerals in different drawings represent the same or similar elements, unless otherwise represented. The implementations set forth in the following description of exemplary embodiments do not represent all implementations consistent with the present disclosure. Instead, these implementations are merely examples of devices and methods consistent with aspects related to the disclosure as recited in the appended claims.

An exemplary embodiment of the present disclosure provides a data transmission method. The method may be implemented by a computer device composed of modules shown in FIG. 1, and functions of each module will be introduced one by one in the process of describing the method provided by the embodiment of the present disclosure. A computer device may be adopted as the sending terminal. The sending terminal may obtain the environmental video captured by the video capturing device, process the environment video by encoding, compressing, and packaging to obtain a video data packet, and send the video data packet to the receiving terminal through a transmission network based on the RTP. After receiving the video data packet, the receiving terminal may play the environmental video based on the video data packet. That is, after receiving the video data packet, the receiving terminal may obtain the video compressed data in the video data packet, decompress the video compressed data to obtain the video encoded data, decode the video encoded data to obtain the environmental data, and then play the environmental video.

During the encoding process, in order to better adapt to a bandwidth of the current transmission network and thereby adjust an outputting bit rate for encoding the environmental video, the sending terminal may determine the current expected sending bit rate based on a preset bit rate algorithm, an actual sending bit rate of the previous preset data sending cycle, and a packet loss rate. The environmental video is then encoded according to the expected sending bit rate to ensure that the actual outputting bit rate is less than the expected sending bit rate, so that the encoded data obtained after encoding may be transmitted to the receiving terminal under the current transmission network environment. There are two encoding modes, namely, a constant bit rate (CBR) and a variable bit rate (VBR). When the environmental video is encoded by the aforesaid two encoding modes, the data volume of the encoded data obtained after the encoding process may vary with the speed of the scene changes in the environmental video. If the scene changes quickly, the data volume of the encoded data obtained after the encoding process is large, and if the scene changes slowly, the data volume of the encoded data obtained after the encoding process is small. When the data volume is large, the sending terminal needs to send more data, and when the data volume is small, the sending needs to send less data.

If a small actual sending bit rate is adopted in the previous preset data sending cycle due to the small volume of the data to be sent, the current expected sending bit rate determined based on the small actual sending bit rate is also small and may have a great difference with the sending bit rate actually achieved currently, so that the sending terminal may determine a wrong current expected sending bit rate, and thereby a number of bandwidths may get vacant and not utilized currently, which is not beneficial to network transmission.

In order to solve the aforesaid problem, the vacant bandwidth may be adopted to send the filling data packet. In this way, the vacant bandwidth is utilized, and the actual sending bit rate is approximately equal to the current expected sending bit rate. The embodiment of the present disclosure provides a method for selecting the filling data packet. The vacant bandwidth can be utilized in the process of sending the filling data packet, and meanwhile, the quality of data transmission can be improved by sending the filling data packet.

Figure 2:
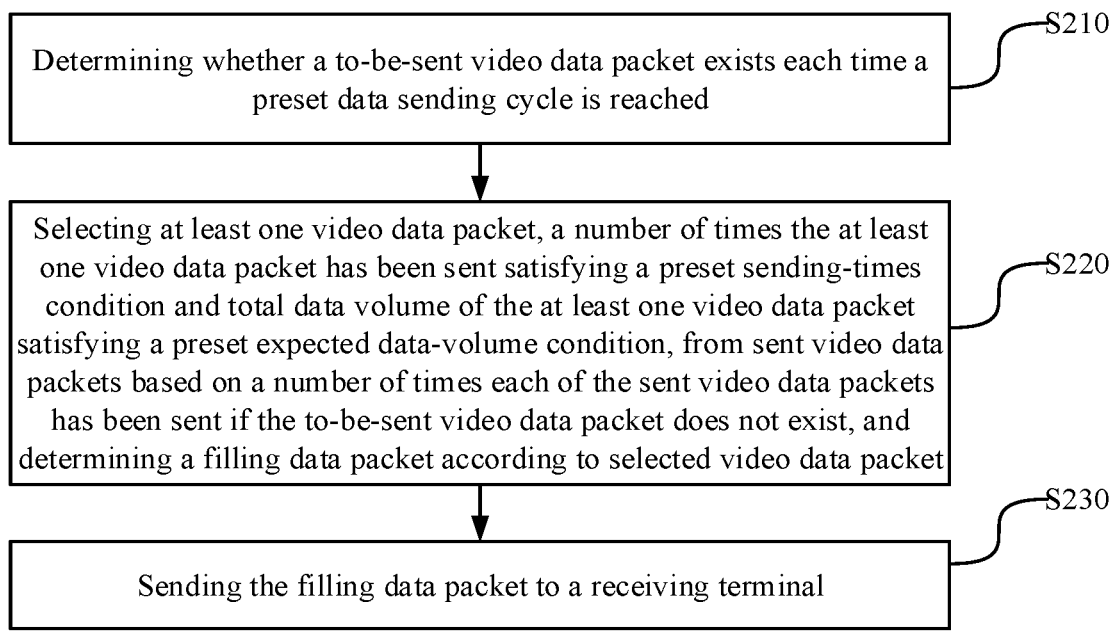
FIG. 2 is a flow chart of a data transmission method according to an embodiment of the present disclosure.

The embodiment of the present disclosure provides a data transmission method. As shown in FIG. 2, the processing procedure of the method may include following steps.

In step S210, whether a to-be-sent video data packet exists is determined each time a preset data sending cycle is reached.

A congestion controlling module shown in FIG. 1 may determine the current expected sending bit rate, such as 400 MB per second, based on the preset bit rate algorithm, the actual sending bit rate in the previous preset data sending cycle, the packet loss rate, and the packet receiving delay time. The congestion controlling module may calculate the expected sending bit rate according to the preset calculating period, and may, for example, calculate the expected sending bit rate every 200 milliseconds. If the transmission rate of the transmission network is relatively stable and there is no large jitter, it may be deemed that the expected sending bit rates calculated in adjacent calculating cycles are approximate to each other.

The congestion controlling module may send the current expected sending bit rate to the encoding module shown in FIG. 1, so that the encoding module may determine the encoding mode based on the current expected sending bit rate. If the current expected sending bit rate is high, an encoding mode with a higher outputting bit rate may be selected, and if the current expected sending bit rate is low, an encoding mode with a lower outputting bit rate may be selected, so that the outputting bit rate can adapt to the current bandwidth of the transmission network. Next, the encoding module encodes the video stream captured by the video capturing device based on the determined encoding mode, and the outputting bit rate is generally lower than the current expected sending bit rate. Subsequently, the encoding module sends the encoded data obtained after the encoding process to a beat module shown in FIG. 1, and the beat module controls a rhythm of the encoded data obtained after the encoding process is sent to the receiving terminal.

The beat module receives the encoded data obtained after the encoding processing is sent by the encoding module, and the encoded data obtained after the encoding processing is segmented and packaged to obtain a plurality of video data packets. The data volume in these video data packets is not exactly the same, and generally falls between a few hundred KB and one thousand KB. At the same time, the congestion controlling module may send the current expected sending bit rate to the beat module. The beat module determines the expected data volume of the video data packets to be sent in each data sending cycle based on the current expected sending bit rate, and then selects at least one video data packet, whose total data volume is approximately equal to the expected data volume, as the video data packet sent to the receiving terminal. A sending queue may be provided in the beat module, and the video data packets sent to the receiving terminal each time are added to the sending queue. Each time a preset data sending cycle, such as 5 milliseconds, is reached, the beat module may determine whether a to-be-sent video data packet exists in the sending queue. If yes, the beat module sends at least one video data packet whose total data volume is approximately equal to the expected data volume in the sending queue to the receiving terminal.

For example, if the beat module stores 1000 video data packets each 200 KB in size (this is only exemplary, and in actual cases, the sizes of video data packets are not exactly equal) and the expected data volume is 2 MB, 10 video data packets would be selected each time, and the total data volume of these video data packets is 2000 KB, which is approximately equal to the expected data volume. The selected 10 video data packets are sent to the receiving terminal when the preset data sending cycle is reached. In this way, it can be ensured that the data volume as sent is approximately equal to the expected data volume, and the actual sending bit rate is approximately equal to the expected sending bit rate.

If the scene in the video changes quickly, the data volume of the encoded data obtained after the encoding process is large, and if the scene changes slowly, the data volume of the encoded data obtained after the encoding process is small. However, no matter how much the data volume of the encoded data obtained after the encoding process is, the outputting bit rate will be less than the expected sending bit rate, which may cause that the data to be sent is insufficient. For example, if the beat module merely stores 1,000 video data packets and the encoded data obtained after the new encoding process has not arrived yet, the 1000 video data packets each 200 KB in size may merely satisfy the data volume for 100 data sending cycles, and no data will be sent after the 100 data sending cycles. The encoded data obtained after the new encoding process may arrive after a plurality of data sending cycles. However, if the data approximate to the expected data volume is not sent in the data sending cycle in which data shall be sent, the actual sending bit rate may fail to reach the expected sending bit rate.

For example, if the expected sending bit rate is 400 MB per second, 400 MB of data shall be sent per second. If the data sending cycle is 5 milliseconds, there are 200 data transmission cycles per second. Thus, the data volume to be sent per data sending cycle is 2 MB. The beat module only stores 1000 video data packets each 200 KB in size. The 1000 video data packets each 200 KB in size may all be sent to the receiving terminal in the former 100 data sending cycles, and thus the encoded data obtained after the new encoding processing may fail to arrive at the latter 100 data sending cycles, which may cause a case that there is no data to send.

In step S220, if the to-be-sent video data packet does not exist, at least one video data packet, a number of times the at least one video data packet has been sent satisfying a preset sending-times condition and total data volume of the at least one video data packet satisfying a preset expected data-volume condition, is selected from sent video data packets based on a number of times each of the sent video data packets has been sent, and a filling data packet is determined according to selected video data packet.

After determining that the to-be-sent video data packet does not exist, the beat module may notify the filling module shown in FIG. 1. Based on the expected data volume, the filling module may select at least one video data packet, a number of times the at least one video data packet has been sent satisfying a preset sending-times condition and whose total data volume is approximately equal to the expected data volume, from the sent video data packets based on the number of times each of the sent video data packets has been sent, and then determine the filling data packet according to the selected video data packet. Since the size of the data volume of each video data packet ranges from several hundred KB to one thousand KB, the total data volume of the selected video data packet may not be completely equal to the expected data volume. When the total data volume of the selected video data packet is not exactly equal to the expected data volume, the video data packet having the total data volume most approximate to the expected data volume may be selected. The method for determining the filling data packet according to the selected video data packet will be described below.

In step S230, the filling data packet is sent to a receiving terminal.

The filling module sends the filling data packet to the beat module. The beat module adds the filling data packet to the sending queue and sends the filling data packet to the receiving terminal through the sending queue.

For example, the beat module may only store 1000 video data packets each 200 KB in size. The 1000 video data packets each 200 KB in size may all be sent to the receiving terminal in the former 100 data sending cycles. If no to-be-sent video data packet is detected in the $101^{st}$ data sending cycle, the filling module may select at least one video data packet, a number of times the at least one video data packet has been sent satisfying a preset sending-times condition and whose total data volume is approximately equal to 2 M, from the sent video data packets based on the number of times each of the sent video data packets has been sent, determine the filling data packet according to the selected video data packet, and then send the filling data packet to the beat module. The beat module adds the filling data packet to the sending queue. In the $101^{st}$ data sending cycle, the filling data packet is sent to the receiving terminal through the sending queue. If there is still no to-be-sent video data packet in the $102^{nd}$ data sending cycle, the aforesaid steps may be performed cyclically until the to-be-sent video data packet is detected in the sending queue.

Since each video data packet carries a corresponding serial number, the receiving terminal may determine whether packet loss occurs according to the serial number. For example, if the serial number of the currently received video data packet is 121, the serial number of the next video data packet shall be 122. If packet loss occurs, the receiving terminal may fail to receive the video data packet with the serial number 122 after elapse of a preset waiting time period but has received a plurality of video data packets with the serial number 123 or even later at this time. Thus, it may be determined that the packet loss occurs in the video data packet with the serial number of 122. Since the sending terminal may send the sent video data packet again as the filling data packet, the receiving terminal may look for a video data packet with the serial number 122 in the filling data packet. If it is found, the video data packet that has the serial number 122 and serves as the filling data packet may be adopted for recovering the video data packet where packet loss occurs.

Optionally, step S220 may include: if the to-be-sent video data packet does not exist, selecting at least one video data packet, a number of times the at least one video data packet has been sent satisfying a preset sending-times condition and total data volume of the at least one video data packet satisfying a preset expected data-volume condition, from the sent video data packets based on a number of times each of the sent video data packets has been sent.

Optionally, step S220 may include: if the to-be-sent video data packet does not exist, selecting at least one video data packet, a number of times the at least one video data packet has been sent satisfying the preset sending-times condition and total data volume of the at least one video data packet satisfying the preset expected data-volume condition, from the sent video data packets corresponding to a current video frame and a previous video frame based on the number of times each of the sent video data packets has been sent, and determining the filling data packet according to the selected video data packet.

Since the data volume of a video frame is rather large, a video frame is generally sent to the receiving terminal through several data sending cycles. After the completion of sending, the sent video data packets are temporarily stored in the sending terminal. During the process of selecting at least one video data packet, the filling module may make selection merely from the sent video data packets corresponding to the current video frame and the previous video frame. The sending terminal sends the video data packet to the receiving terminal in real time through the transmission network based on the RTP protocol, and the receiving terminal plays the video frame based on the video data packet after receiving the video data packet. Thus, it is necessary to ensure the real-time performance during the data transmission process. If at least one video data packet is selected from the sent video data packets corresponding to the current video frame and the video frame before the previous video frame, the receiving terminal has played the current video frame and the video frame before the previous video frame even if the selected video data packet is sent to the receiving terminal. Therefore, even if packet loss occurs to the video data packets corresponding to the current video frame and the video frame before the previous video frame, when the receiving terminal receives the video data packets corresponding to the current video frame and the video frame before the previous video frame for filling, the video data packets may fail to be utilized for recovering the video data packets where the packet loss occurs. Two modes for determining the filling data packet will be described below.

Figure 3:
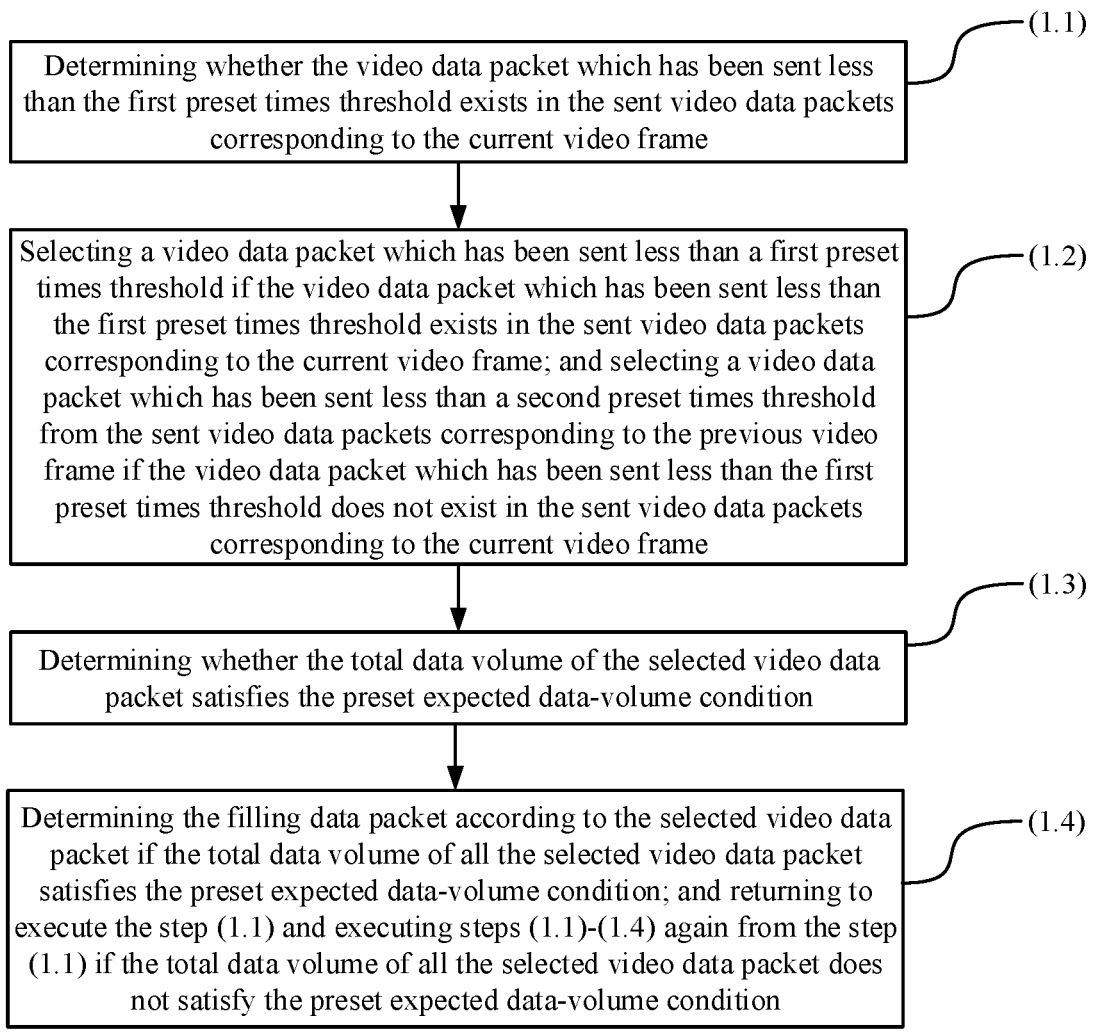
FIG. 3 is a flow chart of a data transmission method according to an embodiment of the present disclosure.

In the first mode, optionally, as shown in FIG. 3, steps of selecting at least one video data packet, the number of times the at least one video data packet has been sent satisfying the preset sending-times condition and total data volume of the at least one video data packet satisfying the preset expected data-volume condition, from the sent video data packets corresponding to the current video frame and the previous video frame based on the number of times each of the sent video data packets has been sent, and determining the filling data packet according to the selected video data packet may include following steps.

In step (1.1), it is determined whether the video data packet which has been sent less than the first preset times threshold exists in the sent video data packets corresponding to the current video frame.

In step (1.2), a video data packet which has been sent less than a first preset times threshold is selected if the video data packet which has been sent less than the first preset times threshold exists in the sent video data packets corresponding to the current video frame; and a video data packet which has been sent less than a second preset times threshold is selected from the sent video data packets corresponding to the previous video frame if the video data packet which has been sent less than the first preset times threshold does not exist in the sent video data packets corresponding to the current video frame.

In step (1.3), it is determined whether the total data volume of the selected video data packet satisfies the preset expected data-volume condition.

In step (1.4), the filling data packet is determined according to the selected video data packet if the total data volume of all the selected video data packet satisfies the preset expected data-volume condition; and if the total data volume of all the selected video data packet does not satisfy the preset expected data-volume condition, it is switched to execute the step (1.1), and steps (1.1)-(1.4) are executed again from the step (1.1).

The second preset times threshold is smaller than the first preset times threshold. For example, if the video data packet which has been sent less than 6 times exists in the sent video data packets corresponding to the current video frame, a video data packet is selected from the video data packets that have been sent less than 6 times. If the video data packet which has been sent less than 6 times does not exists in the sent video data packets corresponding to the current video frame, a video data packet which has been sent less than 3 times is selected from the sent video data packet corresponding to the previous video frame.

After selecting a video data packet each time, it may be determined whether the total data volume of all the selected video data packet satisfies the preset expected data-volume condition or not. If the total data volume of all the selected video data packet satisfies the preset expected data-volume condition, the filling data packet is determined according to the selected video data packet. If the total data volume of all the selected video data packet does not satisfy the preset expected data-volume condition, a video data packet is selected again according to the mode shown in step (1.2) until the total data volume of all the selected video data packet satisfies the preset expected data-volume condition.

Figure 4:
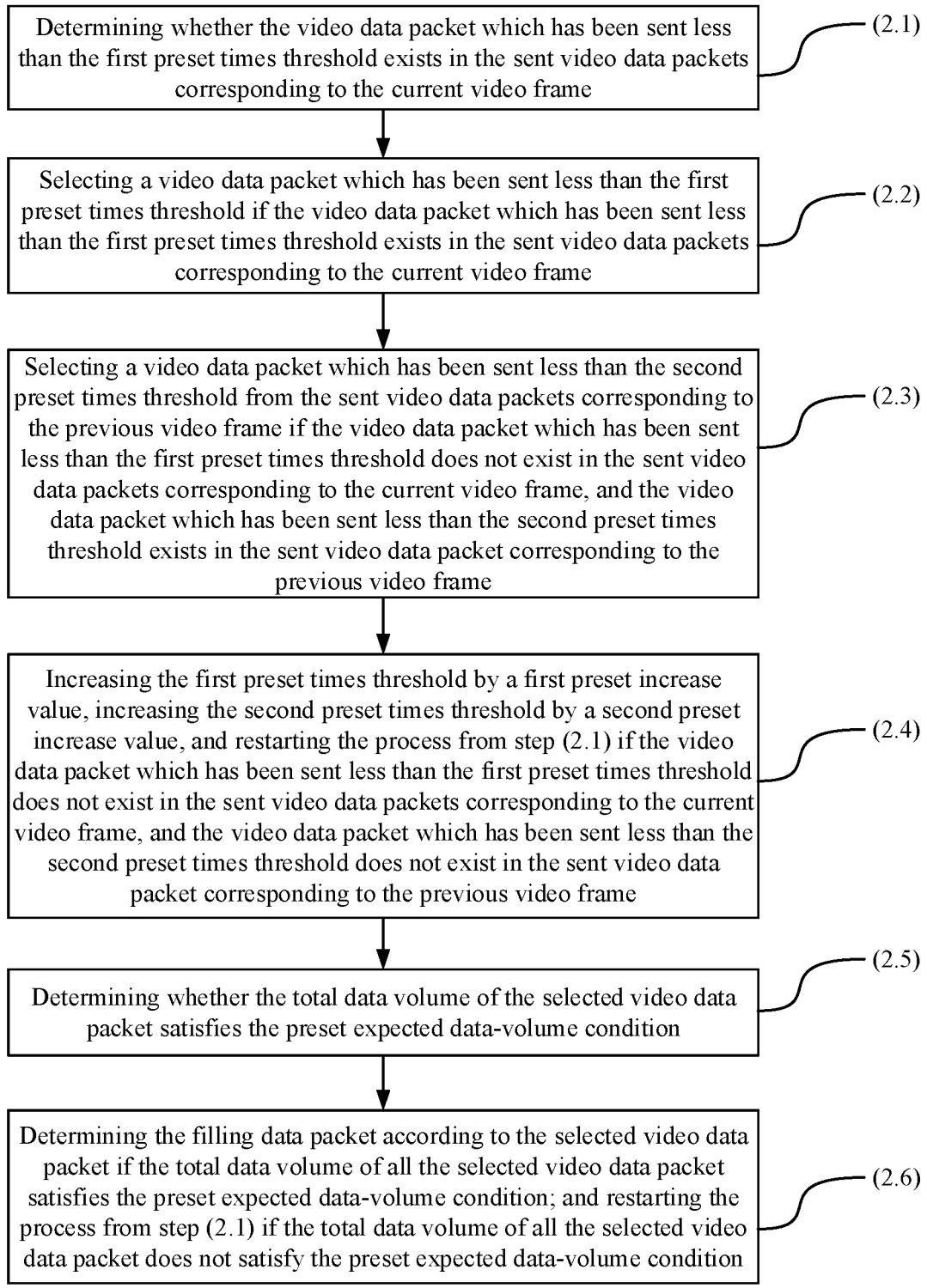
FIG. 4 is a flow chart of a data transmission method according to an embodiment of the present disclosure.

In the second mode, optionally, as shown in FIG. 4, steps of selecting at least one video data packet, the number of times the at least one video data packet has been sent satisfying the preset sending-times condition and total data volume of the at least one video data packet satisfying the preset expected data-volume condition, from the sent video data packets corresponding to the current video frame and the previous video frame based on the number of times each of the sent video data packets has been sent, and determining the filling data packet according to the selected video data packet may include following steps.

In step (2.1), it is determined whether the video data packet which has been sent less than the first preset times threshold exists in the sent video data packets corresponding to the current video frame.

In step (2.2), if the video data packet which has been sent less than the first preset times threshold exists in the sent video data packets corresponding to the current video frame, a video data packet which has been sent less than the first preset times threshold is selected.

In step (2.3), if the video data packet which has been sent less than the first preset times threshold does not exist in the sent video data packets corresponding to the current video frame, and the video data packet which has been sent less than the second preset times threshold exists in the sent video data packet corresponding to the previous video frame, a video data packet which has been sent less than the second preset times threshold is selected from the sent video data packets corresponding to the previous video frame.

In step (2.4), if the video data packet which has been sent less than the first preset times threshold does not exist in the sent video data packets corresponding to the current video frame, and the video data packet which has been sent less than the second preset times threshold does not exist in the sent video data packet corresponding to the previous video frame, the first preset times threshold is increased by a first preset increase value, the second preset times threshold is increased by a second preset increase value, and the process is restarted from step (2.1).

In step (2.5), it is determined whether the total data volume of the selected video data packet satisfies the preset expected data-volume condition.

In step (2.6), if the total data volume of all the selected video data packet satisfies the preset expected data-volume condition, the filling data packet is determined according to the selected video data packet; and if the total data volume of all the selected video data packet does not satisfy the preset expected data-volume condition, the process is restarted from step (2.1) again and continued by executing the following steps.

The second preset times threshold is smaller than the first preset times threshold.

For example, if the video data packet which has been sent less than 6 times exists in the sent video data packets corresponding to the current video frame, a video data packet is selected from the video data packets that have been sent less than 6 times.

If the video data packet which has been sent less than 6 times does not exist in the sent video data packets corresponding to the current video frame, and the video data packet which has been sent less than 3 times exists in the sent video data packet corresponding to the previous video frame, a video data packet which has been sent less than 3 times is selected from the sent video data packets corresponding to the previous video frame.

If the video data packet which has been sent less than 6 times does not exist in the sent video data packets corresponding to the current video frame, and the video data packet which has been sent less than 3 times does not exist in the sent video data packet corresponding to the previous video frame, the first preset times threshold is increased by 3 times, the second preset times threshold is increased by 3 times, and the process is switched to execute step (2.1), and continued by executing the following steps from step (2.1). At this point, the first preset times threshold is changed to 9 times, and the second preset times threshold is changed to 6 times. That is, the preset times threshold may be stepped by 3 times each time there is no video data packet to fill, and a video data packet is selected again according to the new condition.

After selecting a video data packet each time, it may be determined whether the total data volume of all the selected video data packet satisfies the preset expected data-volume condition or not. If the total data volume of all the selected video data packet satisfies the preset expected data-volume condition, the filling data packet is determined according to the selected video data packet. If the total data volume of all the selected video data packet does not satisfy the preset expected data-volume condition, a video data packet is selected again according to the mode shown in step (2.1) until the total data volume of the selected video data packet satisfies the preset expected data-volume condition.

Optionally, the step of selecting a video data packet which has been sent less than a first preset times threshold may include: selecting a video data packet which has been sent a number of times that is less than the first preset times threshold and has a minimum value. The step of selecting a video data packet which has been sent less than the second preset times threshold from the send video data packet corresponding to the previous video frame may include: selecting a video data packet, which has been sent a number of times that is less than the second preset times threshold and has a minimum value, from the send video data packet corresponding to the previous video frame.

When there are two video data packets which have been sent the minimum number of times, one of the two video data packets whose data volume is most approximate to the expected data volume may be selected based on the expected data volume.

Optionally, the aforesaid step (1.4) or step (2.6) may include: determining the total data volume of all the selected video data packet and a sum of data volume of the selected video data packet except the video data packet currently selected; if the total data volume is greater than a preset expected data volume, determining an absolute value of a difference value between the total data volume and the expected data volume, determining an absolute value of a difference value between the sum and the expected data volume, and determining the video data packet corresponding to the minimum absolute value as the filling data packet; if the total data volume is equal to the preset expected data volume, determining the selected video data packet as the filling data packet; and if the total data volume is less than the preset expected data volume, returning to execute step (1.1) or (2.1), and continuing to execute following steps from step (1.1) or step (2.1).

The video data packet whose total data volume is most approximate to the expected data volume may be selected as the filling data packet. For example, if the expected data volume is 2 M and the data volume of each video data packet is 200 KB, the total data volume is 2000 KB when the $10^{th}$ video data packet is selected, which is 48 KB less than the expected data volume. The total data volume becomes 2200 KB when the $11^{th}$ video data packet is selected, which is 152 KB more than the expected data volume. Thus, the 10 video data packets, ignoring the $11^{th}$ video data packet, may be adopted as the filling data packets and sent to the receiving terminal in one data sending cycle.

Of course, in addition to the aforesaid modes, when it is determined that the total data volume of the selected video data packet is greater than or equal to the preset expected data volume, the selected video data packet may be determined as the filling data packets. In this way, the filling data packet selected each time may be a bit more than the expected data volume.

With the method provided in the embodiment of the present disclosure, when the to-be-sent video data pack does not exist, the sent video data packet may be sent to the receiving terminal as a filling data packet. In this way, it can be ensured that the sending terminal may send data to the receiving terminal in each data sending cycle, and the data volume as sent is approximate to the expected data volume, so that the actual sending bit rate of the sending terminal is approximately equal to the expected sending bit rate, and the sending terminal may thereby determine an accurate expected sending bit rate when the next bit rate calculating cycle is reached, which is beneficial for the sending terminal to send data according to the accurate expected sending bit rate, and thereby improves the network transmission efficiency. Furthermore, with the method provided in the embodiment of the present disclosure, based on the number of times each of the sent video data packets has been sent, a video data packet, the number of times the at least one video data packet has been sent satisfying the preset sending-times condition and total data volume of the at least one video data packet satisfying the preset expected data-volume condition, may be selected as the filling data packet and then sent to the receiving terminal. In this way, even if the previously sent video data packet is lost, the filling data packet may be adopted to replace the video data packet where the loss occurs, so that the filling data packet is effectively utilized to improve the quality of data transmission.

Figure 5:
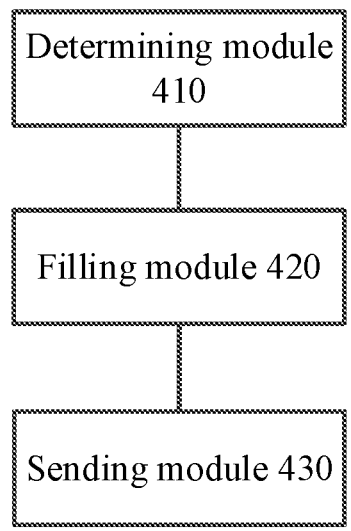
FIG. 5 is a schematic diagram of a structure of a data transmission apparatus according to an embodiment of the present disclosure.

Another embodiment of the present disclosure provides a data transmission apparatus. As shown in FIG. 5, the apparatus may include following modules.

A determining module 510 is used to determine whether a to-be-sent video data packet exist or not each time a preset data sending cycle is reached.

A filling module 520 is used to select, if the to-be-sent video data packet does not exist, at least one video data packet, a number of times the at least one video data packet has been sent satisfying a preset sending-times condition and total data volume of the at least one video data packet satisfying a preset expected data-volume condition, from sent video data packets based on a number of times each of the sent video data packets has been sent, and determine a filling data packet according to selected video data packet.

A sending module 530 is used to send the filling data packet to a receiving terminal.

Optionally, the filling module 520 is used to:

select at least one video data packet, the number of times the at least one video data packet has been sent satisfying the preset sending-times condition and total data volume of the at least one video data packet satisfying the preset expected data-volume condition, from the sent video data packets corresponding to a current video frame and a previous video frame based on the number of times each of the sent video data packets has been sent, and determine the filling data packet according to the selected video data packet.

Optionally, the filling module 520 is used to:

determine whether the video data packet which has been sent less than the first preset times threshold exists in the sent video data packets corresponding to the current video frame;

select a video data packet which has been sent less than a first preset times threshold if the video data packet which has been sent less than the first preset times threshold exists in the sent video data packets corresponding to the current video frame; select a video data packet which has been sent less than a second preset times threshold from the sent video data packets corresponding to the previous video frame if the video data packet which has been sent less than the first preset times threshold does not exist in the sent video data packets corresponding to the current video frame;

determine whether the total data volume of the selected video data packet satisfies the preset expected data-volume condition; and determine the filling data packet according to the selected video data packet if the total data volume of all the selected video data packet satisfies the preset expected data-volume condition; and return to execute a step of determining whether the video data packet which has been sent less than the first preset times threshold exists in the sent video data packets corresponding to the current video frame if the total data volume of all the selected video data packet does not satisfy the preset expected data-volume condition.

Optionally, the filling module 520 is used to:

determine whether the video data packet which has been sent less than the first preset times threshold exists in the sent video data packets corresponding to the current video frame;

select a video data packet which has been sent less than the first preset times threshold if the video data packet which has been sent less than the first preset times threshold exists in the sent video data packets corresponding to the current video frame; select a video data packet which has been sent less than the second preset times threshold from the sent video data packets corresponding to the previous video frame if the video data packet which has been sent less than the first preset times threshold does not exist in the sent video data packets corresponding to the current video frame and the video data packet which has been sent less than the second preset times threshold exists in the sent video data packet corresponding to the previous video frame; and increase the first preset times threshold by a first preset increase value, increase the second preset times threshold by a second preset increase value, and return to execute the step of determining whether the video data packet which has been sent less than the first preset times threshold exists in the sent video data packets corresponding to the current video frame if the video data packet which has been sent less than the first preset times threshold does not exist in the sent video data packets corresponding to the current video frame, and the video data packet which has been sent less than the second preset times threshold does not exist in the sent video data packet corresponding to the previous video frame;

determine whether the total data volume of the selected video data packet satisfies the preset expected data-volume condition; and determine the filling data packet according to the selected video data packet if the total data volume of all the selected video data packet satisfies the preset expected data-volume condition; and return to execute a step of determining whether the video data packet which has been sent less than the first preset times threshold exists in the sent video data packets corresponding to the current video frame if the total data volume of all the selected video data packet does not satisfy the preset expected data-volume condition.

Optionally, the filling module 520 is used to:

determine the total data volume of all the selected video data packet and a sum of data volume of the selected video data packet except the video data packet currently selected;

if the total data volume is greater than a preset expected data volume, determine an absolute value of a difference value between the total data volume and the expected data volume, determine an absolute value of a difference value between the sum and the expected data volume, and determine the video data packet corresponding to the minimum absolute value as the filling data packet;

if the total data volume is equal to the preset expected data volume, determine the selected video data packet as the filling data packet; and return to execute a step of determining whether the video data packet which has been sent less than the first preset times threshold exists in the sent video data packets corresponding to the current video frame if the total data volume is less than a preset expected data volume.

Optionally, the filling module 520 is used to:

select a video data packet which has been sent a number of times that is less than the first preset times threshold value and has a minimum value; and select a video data packet, which has been sent a number of times that is less than the second preset times threshold value and has a minimum value, from the sent video data packets corresponding to the previous video frame.

With regard to the apparatus in the forgoing described embodiments, the specific manner in which the respective modules perform the operations has been described in detail in the embodiments of the method, and will not be explained in detail herein.

With the apparatus provided in the embodiment of the present disclosure, when the to-be-sent video data pack does not exist, the sent video data packet may be sent to the receiving terminal as a filling data packet. In this way, it can be ensured that the sending terminal may send data to the receiving terminal in each data sending cycle, and the data volume as sent is approximate to the expected data volume, so that the actual sending bit rate of the sending terminal is approximately equal to the expected sending bit rate, and the sending terminal may thereby determine an accurate expected sending bit rate when the next bit rate calculating cycle is reached, which is beneficial for the sending terminal to send data according to the accurate expected sending bit rate, and thereby improves the network transmission efficiency. Furthermore, with the method provided in the embodiment of the present disclosure, based on the number of times each of the sent video data packets has been sent, a video data packet, the number of times the at least one video data packet has been sent satisfying the preset sending-times condition and total data volume of the at least one video data packet satisfying the preset expected data-volume condition, may be selected as the filling data packet and then sent to the receiving terminal. In this way, even if the previously sent video data packet is lost, the filling data packet may be adopted to replace the video data packet where the loss occurs, so that the filling data packet is effectively utilized to improve the quality of data transmission.

It should be noted that the data transmission apparatus provided by the present embodiment only takes division of all the functional modules as an example for explanation when transmitting data. In practice, the above functions can be finished by the different functional modules as required. That is, the internal structure of the apparatus is divided into different functional modules to finish all or part of the functions described above. In addition, the data transmission apparatus provided by the present embodiment has the same concept as the data transmission method provided by the foregoing embodiment. Refer to the method embodiment for the specific implementation process of the method, which will not be repeated herein.

Figure 6:
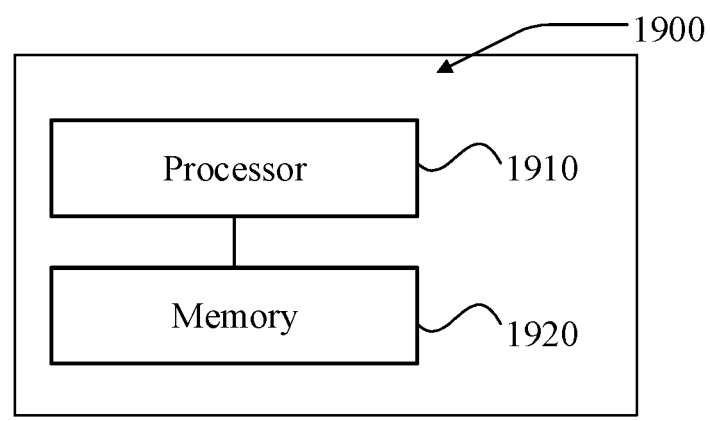
FIG. 6 is a schematic diagram of a structure of a computer device according to an embodiment of the present disclosure.

FIG. 6 is a block diagram showing a computer device 1900 according to an embodiment of the present disclosure. For example, the computer device 1900 may vary significantly in configuration or capabilities, and may include one or more processors 1910 (for example, one or more central processing units (CPUs)), and one or more memories 1920. The one or more memories 1920 store at least one instruction which may be loaded and executed by the processor 1910 to realize the data transmission method provided by the above embodiments.

Other embodiments of the present disclosure will be apparent to those skilled in the art from consideration of the specification and practice of the present disclosure. This application is intended to cover any variations, uses, or adaptations of the present disclosure following the general principles thereof and including common knowledge or commonly used technical measures which are not disclosed herein. The specification and embodiments are to be considered as exemplary only, and the true scope and spirit of the present disclosure are indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure is only limited by the appended claims.

The invention claimed is:

1. A data transmission method, comprising:

in each data sending cycle, determining whether a to-be-sent video data packet exists in a sending queue;

in response to determining that the to-be-sent video data packet does not exist in the sending queue, selecting at least one video data packet, a number of times the at least one video data packet has been sent satisfying a sending-times condition and a total data volume of the at least one video data packet satisfying an expected data-volume condition, from sent video data packets corresponding to a current video frame and a previous video frame based on a number of times each of the sent video data packets has been sent, and determining a filling data packet according to the selected video data packet; and sending the filling data packet to a receiving terminal;

wherein selecting at least one video data packet and determining a filling data packet according to the selected video data packet comprises:

determining whether a video data packet which has been sent less than a first threshold number of times exists in sent video data packets corresponding to the current video frame;

selecting a video data packet which has been sent less than the first threshold number of times in response to determining that the video data packet which has been sent less than the first threshold number of times exists in the sent video data packets corresponding to the current video frame; selecting a video data packet which has been sent less than a second threshold number of times from sent video data packets corresponding to the previous video frame in response to determining that the video data packet which has been sent less than the first threshold number of times does not exist in the sent video data packets corresponding to the current video frame and the video data packet which has been sent less than the second threshold number of times exists in the sent video data packets corresponding to the previous video frame; and increasing the first threshold number of times by a first increase value, increasing the second threshold number of times by a second increase value, and returning to execute the step of determining whether the video data packet which has been sent less than the first threshold number of times exists in the sent video data packets corresponding to the current video frame in response to determining that the video data packet which has been sent less than the first threshold number of times does not exist in the sent video data packets corresponding to the current video frame, and the video data packet which has been sent less than the second threshold number of times does not exist in the sent video data packets corresponding to the previous video frame;

determining whether the total data volume of at least one selected video data packet satisfies the expected data-volume condition; and determining the filling data packet according to the selected video data packet in response to the total data volume of the at least one selected video data packet satisfying the expected data-volume condition; and returning to execute the step of determining whether the video data packet which has been sent less than the first threshold number of times exists in the sent video data packets corresponding to the current video frame in response to the total data volume of the at least one selected video data packet not satisfying the expected data-volume condition.

2. The method according to claim 1, wherein selecting the at least one video data packet and determining the filling data packet according to the selected video data packet comprise:
   determining whether a video data packet which has been sent less than a first threshold number of times exists in sent video data packets corresponding to the current video frame;
   selecting a video data packet which has been sent less than the first threshold number of times in response to determining that the video data packet which has been sent less than the first threshold number of times exists in the sent video data packets corresponding to the current video frame; selecting a video data packet which has been sent less than a second threshold number of times from sent video data packets corresponding to the previous video frame in response to determining that the video data packet which has been sent less than the first threshold number of times does not exist in the sent video data packets corresponding to the current video frame;
   determining whether the total data volume of at least one selected video data packet satisfies the expected data-volume condition; and
   determining the filling data packet according to the selected video data packet in response to the total data volume of the at least one selected video data packet satisfying the expected data-volume condition; and returning to execute the step of determining whether the video data packet which has been sent less than the first threshold number of times exists in the sent video data packets corresponding to the current video frame in response to the total data volume of the at least one selected video data packet not satisfying the expected data-volume condition.

3. The method according to claim 2, wherein determining the filling data packet according to the selected video data packet in response to the total data volume of the at least one selected video data packet satisfying the expected data-volume condition comprises:
   determining the total data volume of the at least one selected video data packet and a sum of data volume of the selected video data packet except a video data packet currently selected;
   in response to the total data volume being greater than an expected data volume, determining an absolute value of a difference value between the total data volume and the expected data volume, determining an absolute value of a difference value between the sum and the expected data volume, and determining a video data packet corresponding to a minimum absolute value as the filling data packet; and
   in response to the total data volume being equal to the expected data volume, determining the selected video data packet as the filling data packet;
   wherein returning to execute the step of determining whether the video data packet which has been sent less than the first threshold number of times exists in the sent video data packets corresponding to the current video frame in response to the total data volume of the at least one selected video data packet not satisfying the expected data-volume condition comprises:
   in response to the total data volume being less than the expected data volume, returning to execute the step of determining whether the video data packet which has been sent less than the first threshold number of times exists in the sent video data packets corresponding to the current video frame.

4. The method according to claim 2, wherein selecting the video data packet which has been sent less than the first threshold number of times comprises:
   selecting a video data packet which has been sent less than the first threshold number of times and has been sent a minimum number of times; and
   wherein selecting the video data packet which has been sent less than the second threshold number of times from the sent video data packets corresponding to the previous video frame comprises:
   selecting a video data packet, which has been sent less than the second threshold number of times and has been sent a minimum number of times, from the sent video data packets corresponding to the previous video frame.

5. The method according to claim 1, wherein determining the filling data packet according to the selected video data packet in response to the total data volume of the at least one selected video data packet satisfying the expected data-volume condition comprises:
   determining the total data volume of the at least one selected video data packet and a sum of data volume of the selected video data packet except a video data packet currently selected;
   in response to the total data volume being greater than an expected data volume, determining an absolute value of a difference value between the total data volume and the expected data volume, determining an absolute value of a difference value between the sum and the expected data volume, and determining a video data packet corresponding to a minimum absolute value as the filling data packet;
   in response to the total data volume being equal to the expected data volume, determining the selected video data packet as the filling data packet;
   wherein returning to execute the step of determining whether the video data packet which has been sent less than the first threshold number of times exists in the sent video data packets corresponding to the current video frame in response to determining that the total data volume of the at least one selected video data packet does not satisfy the expected data-volume condition comprises:
   in response to the total data volume being less than the expected data volume, returning to execute the step of determining whether the video data packet which has been sent less than the first threshold number of times exists in the sent video data packets corresponding to the current video frame.

6. A data transmission apparatus, comprising:
   a determining module, configured to determine whether a to-be-sent video data packet exists in a sending queue in each data sending cycle;

a filling module, configured to select, if the to-be-sent video data packet does not exist in the sending queue, at least one video data packet, a number of times the at least one video data packet has been sent satisfying a sending-times condition and a total data volume of the at least one video data packet satisfying an expected data-volume condition, from sent video data packets corresponding to a current video frame and a previous video frame based on a number of times each of the sent video data packets has been sent, and determine a filling data packet according to the selected video data packet; and a sending module, configured to send the filling data packet to a receiving terminal;

wherein the filling module is configured to:

determine whether a video data packet which has been sent less than a first threshold number of times exists in sent video data packets corresponding to the current video frame;

select a video data packet which has been sent less than the first threshold number of times if the video data packet which has been sent less than the first threshold number times exists in the sent video data packets corresponding to the current video frame; select a video data packet which has been sent less than a second threshold number of times from sent video data packets corresponding to the previous video frame if the video data packet which has been sent less than the first threshold number of times does not exist in the sent video data packets corresponding to the current video frame;

determine whether the total data volume of at least one selected video data packet satisfies the expected data-volume condition; and determine the filling data packet according to the selected video data packet if the total data volume of the at least one selected video data packet satisfies the expected data-volume condition; and return to execute a step of determining whether the video data packet which has been sent less than the first threshold number of times exists in the sent video data packets corresponding to the current video frame if the total data volume of the at least one selected video data packet does not satisfy the expected data-volume condition.

7. The apparatus according to claim 6, wherein the filling module is configured to:

determine whether a video data packet which has been sent less than a first threshold number of times exists in sent video data packets corresponding to the current video frame;

select a video data packet which has been sent less than the first threshold number of times if the video data packet which has been sent less than the first threshold number times exists in the sent video data packets corresponding to the current video frame; select a video data packet which has been sent less than a second threshold number of times from sent video data packets corresponding to the previous video frame if the video data packet which has been sent less than the first threshold number of times does not exist in the sent video data packets corresponding to the current video frame;

determine whether the total data volume of at least one selected video data packet satisfies the expected data-volume condition; and determine the filling data packet according to the selected video data packet if the total data volume of the at least one selected video data packet satisfies the expected data-volume condition; and return to execute a step of determining whether the video data packet which has been sent less than the first threshold number of times exists in the sent video data packets corresponding to the current video frame if the total data volume of the at least one selected video data packet does not satisfy the expected data-volume condition.

8. The apparatus according to claim 7, wherein the filling module is configured to:

determine the total data volume of the at least one selected video data packet and a sum of data volume of the selected video data packet except a video data packet currently selected;

if the total data volume is greater than an expected data volume, determine an absolute value of a difference value between the total data volume and the expected data volume, determine an absolute value of a difference value between the sum and the expected data volume, and determine a video data packet corresponding to a minimum absolute value as the filling data packet;

if the total data volume is equal to the expected data volume, determine the selected video data packet as the filling data packet; and if the total data volume is less than the expected data volume, return to execute the step of determining whether the video data packet which has been sent less than the first threshold number of times exists in the sent video data packets corresponding to the current video frame.

9. The apparatus according to claim 7, wherein the filling module is configured to:

select a video data packet which has been sent less than the first threshold number of times and has been sent a minimum number of times; and select a video data packet, which has been sent less than the second threshold number of times value and has been sent a minimum number of times, from the sent video data packets corresponding to the previous video frame.

10. The apparatus according to claim 6, wherein the filling module is configured to:

determine the total data volume of the at least one selected video data packet and a sum of data volume of the selected video data packet except a video data packet currently selected;

if the total data volume is greater than an expected data volume, determine an absolute value of a difference value between the total data volume and the expected data volume, determine an absolute value of a difference value between the sum and the expected data volume, and determine a video data packet corresponding to a minimum absolute value as the filling data packet;

if the total data volume is equal to the expected data volume, determine the selected video data packet as the filling data packet; and if the total data volume is less than the expected data volume, return to execute the step of determining whether the video data packet which has been sent less than the first threshold number of times exists in the sent video data packets corresponding to the current video frame.

11. A computer device, comprising: a processor, a communication interface, a memory, and a communication bus, wherein:

the processor, the communication interface, and the memory complete communication with each other through the communication bus;
the memory is configured to store a computer program; and
the processor is configured to execute programs stored in the memory to implement a data transmission method comprising:
in each data sending cycle, determining whether a to-be-sent video data packet exists in a sending queue;
in response to determining that the to-be-sent video data packet does not exist in the sending queue, selecting at least one video data packet, a number of times the at least one video data packet has been sent satisfying a sending-times condition and a total data volume of the at least one video data packet satisfying an expected data-volume condition, from sent video data packets corresponding to a current video frame and a previous video frame based on a number of times each of the sent video data packets has been sent, and determining a filling data packet according to the selected video data packet; and
sending the filling data packet to a receiving terminal;
wherein selecting at least one video data packet and determining a filling data packet according to the selected video data packet comprises:
determining whether a video data packet which has been sent less than a first threshold number of times exists in sent video data packets corresponding to the current video frame;
selecting a video data packet which has been sent less than the first threshold number of times in response to determining that the video data packet which has been sent less than the first threshold number of times exists in the sent video data packets corresponding to the current video frame; selecting a video data packet which has been sent less than a second threshold number of times from sent video data packets corresponding to the previous video frame in response to determining that the video data packet which has been sent less than the first threshold number of times does not exist in the sent video data packets corresponding to the current video frame and the video data packet which has been sent less than the second threshold number of times exists in the sent video data packets corresponding to the previous video frame; and increasing the first threshold number of times by a first increase value, increasing the second threshold number of times by a second increase value, and returning to execute the step of determining whether the video data packet which has been sent less than the first threshold number of times exists in the sent video data packets corresponding to the current video frame in response to determining that the video data packet which has been sent less than the first threshold number of times does not exist in the sent video data packets corresponding to the current video frame, and the video data packet which has been sent less than the second threshold number of times does not exist in the sent video data packets corresponding to the previous video frame;
determining whether the total data volume of at least one selected video data packet satisfies the expected data-volume condition; and
determining the filling data packet according to the selected video data packet in response to the total data volume of the at least one selected video data packet satisfying the expected data-volume condition; and
returning to execute the step of determining whether the video data packet which has been sent less than the first threshold number of times exists in the sent video data packets corresponding to the current video frame in response to the total data volume of the at least one selected video data packet not satisfying the expected data-volume condition.

12. The computer device according to claim 11, wherein selecting the at least one video data packet and determining the filling data packet according to the selected video data packet comprise:
determining whether a video data packet which has been sent less than a first threshold number of times exists in sent video data packets corresponding to the current video frame;
selecting a video data packet which has been sent less than a first threshold number of times in response to determining that the video data packet which has been sent less than the first threshold number of times exists in the sent video data packets corresponding to the current video frame; selecting a video data packet which has been sent less than a second threshold number of times from sent video data packets corresponding to the previous video frame in response to determining that the video data packet which has been sent less than the first threshold number of times does not exist in the sent video data packets corresponding to the current video frame;
determining whether the total data volume of at least one selected video data packet satisfies the expected data-volume condition; and
determining the filling data packet according to the selected video data packet in response to the total data volume of the at least one selected video data packet satisfying the expected data-volume condition; and
returning to execute the step of determining whether the video data packet which has been sent less than the first threshold number of times exists in the sent video data packets corresponding to the current video frame in response to the total data volume of the at least one selected video data packet not satisfying the expected data-volume condition.

13. The computer device according to claim 12, wherein determining the filling data packet according to the selected video data packet in response to the total data volume of the at least one selected video data packet satisfying the expected data-volume condition comprises:
determining the total data volume of the at least one selected video data packet and a sum of data volume of the selected video data packet except a video data packet currently selected;
in response to the total data volume being greater than an expected data volume, determining an absolute value of a difference value between the total data volume and the expected data volume, determining an absolute value of a difference value between the sum and the expected data volume, and determining a video data packet corresponding to a minimum absolute value as the filling data packet;
in response to the total data volume being equal to the expected data volume, determining the selected video data packet as the filling data packet;
wherein returning to execute the step of determining whether the video data packet which has been sent less than the first threshold number of times exists in the sent video data packets corresponding to the current video frame in response to the total data volume of the at least one selected video data packet not satisfying the expected data-volume condition comprises:
    in response to the total data volume being less than the expected data volume, returning to execute the step of determining whether the video data packet which has been sent less than the first threshold number of times exists in the sent video data packets corresponding to the current video frame.

14. The computer device according to claim 12, wherein selecting the video data packet which has been sent less than the first threshold number of times comprises:
    selecting a video data packet which has been sent less than the first threshold number of times and has been sent a minimum number of times; and
    wherein selecting the video data packet which has been sent less than the second threshold number of times from the sent video data packets corresponding to the previous video frame comprises:
    selecting a video data packet, which has been sent less than the second threshold number of times and has been sent a minimum number of times, from the sent video data packets corresponding to the previous video frame.

15. The computer device according to claim 11, wherein determining the filling data packet according to the selected video data packet in response to the total data volume of the at least one selected video data packet satisfying the expected data-volume condition comprises:
    determining the total data volume of the at least one selected video data packet and a sum of data volume of the selected video data packet except a video data packet currently selected;
    in response to the total data volume being greater than an expected data volume, determining an absolute value of a difference value between the total data volume and the expected data volume, determining an absolute value of a difference value between the sum and the expected data volume, and determining a video data packet corresponding to a minimum absolute value as the filling data packet; and
    in response to the total data volume being equal to the expected data volume, determining the selected video data packet as the filling data packet;
    wherein returning to execute the step of determining whether the video data packet which has been sent less than the first threshold number of times exists in the sent video data packets corresponding to the current video frame in response to determining that the total data volume of the at least one selected video data packet does not satisfy the expected data-volume condition comprises:
    in response to the total data volume being less than the expected data volume, returning to execute the step of determining whether the video data packet which has been sent less than the first threshold number of times exists in the sent video data packets corresponding to the current video frame.

16. A non-transitory computer-readable storage medium storing computer programs, wherein the computer programs, when executed by a processor, cause the processor to implement steps in the method according to claim 1.

* * * * *